(12) United States Patent
Bunse

(10) Patent No.: US 9,933,081 B2
(45) Date of Patent: Apr. 3, 2018

(54) BURSTING DISC WITH THERMAL INSULATION

(71) Applicant: Brilex Gesellschaft für Explosionsschutz mbH, Brilon (DE)

(72) Inventor: Martin Bunse, Brilon (DE)

(73) Assignee: Brilex Gesellschaft für Explosionsschutz mbH, Brilon (DE)

( * ) Notice: Subject to any disclaimer, the term of this patent is extended or adjusted under 35 U.S.C. 154(b) by 74 days.

(21) Appl. No.: 15/267,905

(22) Filed: Sep. 16, 2016

(65) Prior Publication Data

US 2017/0074412 A1    Mar. 16, 2017

(30) Foreign Application Priority Data

Sep. 16, 2015 (DE) .................. 10 2015 115 621

(51) Int. Cl.
| | |
|---|---|
| F16K 17/40 | (2006.01) |
| F16K 17/16 | (2006.01) |
| F16K 17/36 | (2006.01) |
| F16K 27/12 | (2006.01) |

(52) U.S. Cl.
CPC .............. F16K 17/16 (2013.01); F16K 17/36 (2013.01); F16K 17/403 (2013.01); F16K 27/12 (2013.01)

(58) Field of Classification Search
CPC ........ F16K 17/16; F16K 17/36; F16K 17/403; F16K 27/12
USPC ... 137/68.23, 68.19, 68.22, 68.28, 375, 377, 137/378
See application file for complete search history.

(56) References Cited

U.S. PATENT DOCUMENTS

| | | | | |
|---|---|---|---|---|
| 2,290,038 A | * | 7/1942 | Folmsbee | ................. B60P 3/22 |
| | | | | 105/358 |
| 2,650,180 A | * | 8/1953 | Walker | .................. F16L 59/024 |
| | | | | 137/375 |
| 3,972,442 A | | 8/1976 | Malcolm | |

(Continued)

FOREIGN PATENT DOCUMENTS

| | | |
|---|---|---|
| DE | 2458648 A1 | 6/1975 |
| DE | 69007781 T2 | 8/1994 |

(Continued)

OTHER PUBLICATIONS

European Search Report U.S. Appl. No. 16/188,968 dated Jan. 18, 2017 1 Page.

*Primary Examiner* — Minh Le
(74) *Attorney, Agent, or Firm* — Whitmyer IP Group LLC

(57) ABSTRACT

A bursting disc with a flange area for attachment to an edge of an opening in a wall of a ventilation system, the central area adjacent the flange area along a predetermined breaking line equipped with thermal insulation on the bursting disc side which stretches at least not across the mounting element of the flange area so a niche is formed, bordered by the flange area and the thermal insulation on the bursting disc side. A bursting disc arrangement in which the bursting disc is mounted at the edge of an opening in a wall of a ventilation system and closes the opening, the wall equipped with thermal insulation on the system side which stretches to the flange area of the bursting disc, a gap corresponding to the niche is formed between at least one thermal insulation on the bursting disc side and the thermal insulation on the system side.

9 Claims, 2 Drawing Sheets

(56) References Cited

U.S. PATENT DOCUMENTS

| | | | | |
|---|---|---|---|---|
| 4,315,575 A | * | 2/1982 | Schwarz | B01J 3/002 |
| | | | | 137/68.23 |
| 4,347,942 A | * | 9/1982 | Jernberg | F17C 13/06 |
| | | | | 137/68.27 |
| 4,662,126 A | * | 5/1987 | Malcolm | B65D 90/36 |
| | | | | 220/89.2 |
| 5,549,487 A | * | 8/1996 | Nortier | E03C 1/055 |
| | | | | 361/730 |
| 5,577,740 A | * | 11/1996 | Purdom | F16K 17/383 |
| | | | | 220/201 |
| 2005/0247009 A1 | * | 11/2005 | Vagedes | E03B 7/10 |
| | | | | 52/698 |
| 2007/0234655 A1 | | 10/2007 | Jakus et al. | |
| 2016/0229553 A1 | * | 8/2016 | Kamihara | B64D 45/04 |

FOREIGN PATENT DOCUMENTS

| | | |
|---|---|---|
| DE | 4405471 A1 | 7/1995 |
| DE | 19542092 A1 | 5/1997 |
| DE | 19901160 A1 | 7/2000 |
| DE | 102004023783 A1 | 12/2005 |

\* cited by examiner

US 9,933,081 B2

BURSTING DISC WITH THERMAL INSULATION

CROSS-REFERENCE TO RELATED APPLICATIONS

This patent application claims priority of German Patent Application No. 10 2015 115 621.0, filed on Sep. 16, 2015, the content of which is incorporated herein by reference in its entirety.

TECHNICAL FIELD

The invention concerns a bursting disc with a flange area for attachment to an edge of an opening in a wall of a ventilation system, the central area adjacent to the flange area along a predetermined breaking line of which is equipped with thermal insulation on the bursting disc side which stretches at least not across the mounting element of the flange area so that a niche is formed, bordered by the flange area and the thermal insulation on the bursting disc side. Furthermore, the invention concerns a bursting disc arrangement in which the aforementioned bursting disc is mounted at the edge of an opening in a wall of a ventilation system and closes the opening, wherein the wall is equipped with thermal insulation on the system side which stretches to the flange area of the bursting disc, wherein a gap corresponding to the niche is formed between at least one thermal insulation on the bursting disc side and the thermal insulation on the system side.

BACKGROUND

Bursting discs are used on ventilation systems, in particular in the timber processing industry, wherein flammable dust is transported by the ventilation system. In the event of an explosion as a result of ignition, a central area of the bursting disc can disengage from the flange area surrounding it for the purposes of pressure reduction and in order to swivel a hinge, similar to a joint, into an opening position. Here, the detachment of the central area from the flange area occurs along a predetermined breaking line.

Bursting discs of this type are known from DE 195 42 092 A1, DE 199 01 160 A1, DE 690 007 781 T1.

The attachment of thermal insulation, for example in the form of a thermal insulation cartridge, to the wide side faces of the bursting disc pointing outward, namely to the central area, is also known. The cartridge can have a metal cover. The hollow chamber formed by the cover contains mineral wool or another suitable insulation material. The cartridge can be attached to the central area. However, it is also possible to attach the cartridge to the flange area in the hinge area so that the cartridge does not impede the proper opening of the central area in the event of an explosion. The ventilation system has a wall which is equipped with thermal insulation on the system side. This thermal insulation can also consist of mineral wool or another suitable insulation material. The insulation material is covered on the surface with a metal layer, for example with sheet metal. In order to allow a bursting disc to be changed, the thermal insulation on the system side may not stretch over the flange area. It therefore only reaches up to the flange area. Since the thermal insulation on the bursting disc side may also not stretch over the flange area in order to ensure access to the fastening elements with which the flange area is mounted at the edge of the opening in the wall of the ventilation system, a cold bridge forms in the flange area.

SUMMARY

The primary object of the invention is to further develop a class-specific bursting disc or bursting disc arrangement advantageously.

The problem is solved by the invention set out in the claims, wherein the subclaims present not only beneficial further developments but in principle also independent solutions to the problem.

Firstly and essentially, insulation is provided on the flange which can be fitted to the flange area in a manner which fills the niche after attachment of the flange area at the edge of the opening. This can be done by introducing loose insulation wool into the gap between the thermal insulation on the system side and the thermal insulation on the bursting disc side. After this, the gap or the niche between the side walls of the thermal insulation on the bursting disc side and the flange area is then overlaid through the edge of a cover so that the thermal insulation on the flange side is protected against rain. The installation on the flange area is preferably done in a horizontal manner. The bursting disc according to the invention can be attached not only to horizontal walls on a system but also to vertical walls on a system. The cover is attached to the bursting disc, in particular in the central area, but is preferably attached directly to the thermal insulation on the bursting disc side. The thermal insulation on the flange side can be compressed sufficiently to ensure the proper functioning of the bursting disc. The cover is preferably made from thin sheet metal which can deform in the event that the bursting disc is opened. The gap formed between the thermal insulation on the system side and the thermal insulation on the bursting disc side is sealed with the edge of the cover. This gap is filled with the thermal insulation on the flange side so that the cold bridge is effectively reduced. In a preferred design, the thermal insulation on the bursting disc side is formed of a cartridge which is attached to the outside of the central area, where the cartridge is attached either to the central area or to a hinge area of the flange. However, the cartridge can also be attached both to the flange area on the hinge side and to the central area of the bursting disc. The cartridge preferably has a metallic wall which stretches parallel to the central area with clearance. The flange area defines a mounting level. The metallic wall of the cartridge stretches in parallel level with this mounting level. The thermal insulation on the system side occurs up to a trigger which stretches along the outline of the flange. This trigger is formed of a sheet metal frame. The sheet metal frame surrounds an area in which the entire flange area is integrated. The flange area can have mounting holes through which the mounting screws with which the flange area is attached at the edge of the opening in the wall reach. These mounting screws are accessible from the outside. The gap between the side wall of the thermal insulation on the bursting disc side, which is formed in particular by a metallic area of the cartridge, and the sheet metal frame serves this purpose. According to the invention, a loose insulation material, for example a loose mineral wool, is inserted into this gap. The gap can extend around the thermal insulation on the bursting disc side, so in particular the cartridge. This gap in the right-hand corner in a plan view is filled with the loose insulation wool. The thermal insulation on the bursting disc side and in particular the insulation cartridge has fastening elements with which the cover can be attached. In particular, locking nuts into which the mounting screws with which the cover is attached to the cartridge can be screwed are provided. The cover can be a metal plate which stretches across the entire central area and the entire flange area. The edge of the cover thus encloses the outer edge of the flange area in a plan view so that the bursting disc is completely covered by the cover. However, it is also possible for the cover to only stretch across the gap or the niche. The cover, preferably formed by a metal sheet, thus forms an edge section which stretches more or less in a parallel level to the mounting level. This edge area thus lies opposite the flange area in relation to the niche. It stretches across the niche is a direction determined by the flange area. In a preferred further development, the edge area of the cover has an overhang pointing in the direction of the flange. The overhang can stretch along the entire peripheral edge of the cover and forms a rain protection collar. This rain rain protection collar overlaps a bar which is formed of the sheet steel frame and which protrudes in a direction determined by the wall of the ventilation system over the cover for the thermal insulation on the system side. The overhang can be around 10 mm. This results in protection of the gap filled with the thermal insulation on the flange side against rain.

BRIEF DESCRIPTION OF THE DRAWINGS

The invention is explained in more detail below by means of a design example. It shows.

DETAILED DESCRIPTION

Figure 1:
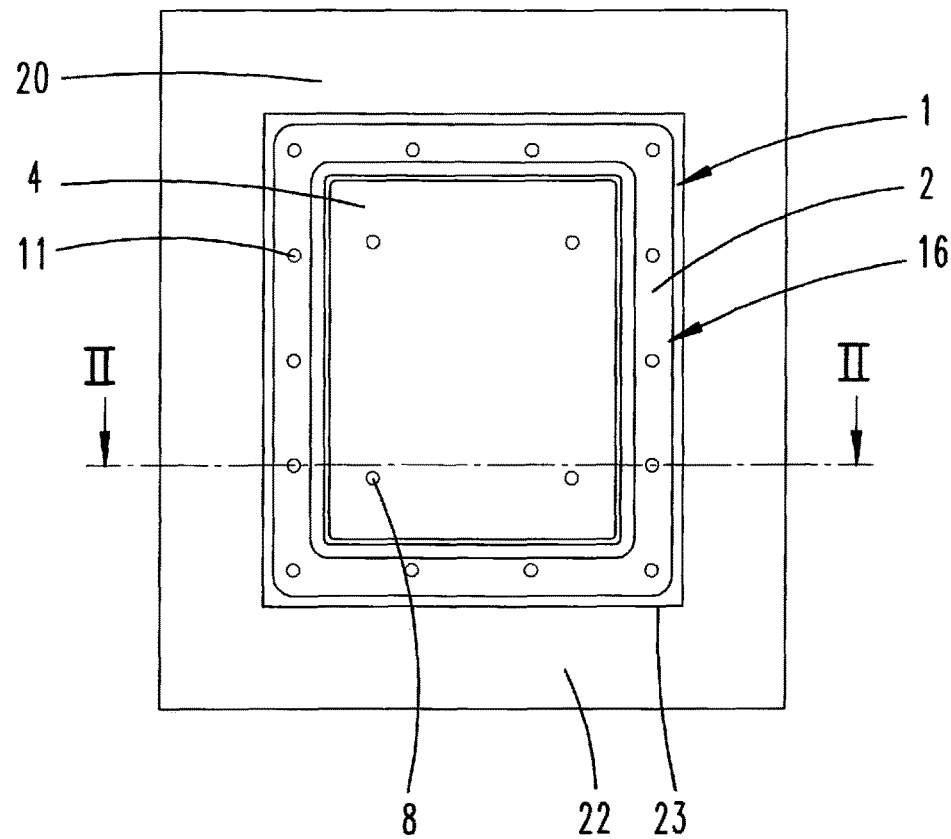
FIG. 1 is the plan view of the wall of a ventilation system with a bursting disc 1 which closes an opening 21 in the wall 20 and a gap 16 formed between thermal insulation on the bursting disc side 4 and thermal insulation on the system side 22 in which the flange area 2 of the bursting disc 1 stretches.
Figure 3:
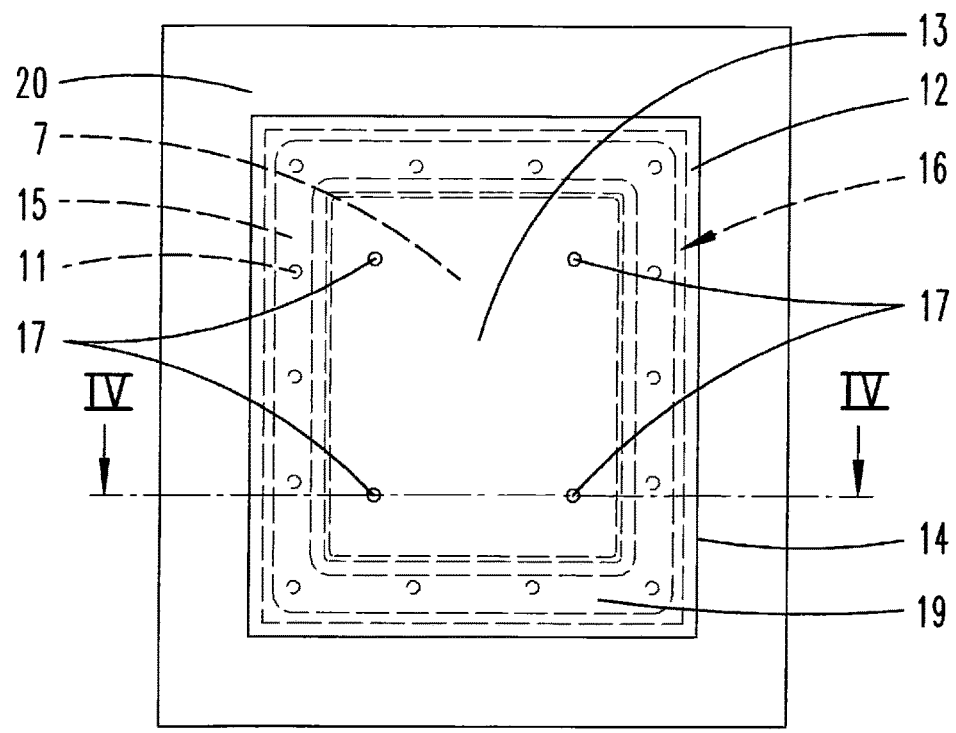
FIG. 3 is a representation according to FIG. 1, but after filling of the gap 16 with thermal insulation on the flange side 15 and covering of the gap 16 with a cover 12.
Figure 4:
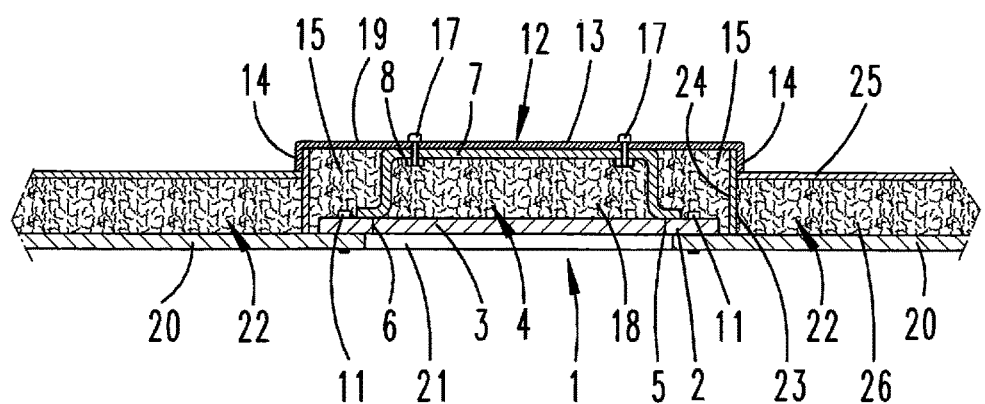
FIG. 4 is a section according to the line IV-IV in FIG. 3.

FIGS. 1 and 3 show the plan view of a horizontal wall 20 of a ventilation system, for example a dust transportation shaft, through which an explosive dust is transported by means of a flow of air, in timber processing, for example. The wall 20 of the shaft has an opening 21, which has an edge area surrounding the opening. A flange area 2 or a bursting disc 1 is attached to this edge area surrounding the opening 21. The flange area 2 thus lies in a mounting level and is attached to the wall 20 by means of mounting screws which reach through mounting openings 11. The flange area 2 has a plurality of mounting openings through which the mounting screws can be inserted. Alternatively, riveting is also possible.

The flange area 2 surrounds a central area 3. The central area 3 borders the flange area 2 along a predetermined breaking line 5 or a hinge 6.

The wide side face on the shaft periphery of the central area 3 is equipped with thermal insulation on the bursting disc side 4. This is a cartridge which is formed by a through-shaped sheet metal part 7. The sheet metal part 7 has a mounting edge 9 with which the cartridge 4 is attached both to the central area 3 and to the flange area 2 in the hinge area 6. A rim 10 extends in the predetermined breaking line area 5 and can overlap the predetermined breaking line 5.

The metallic wall 7 extends in a level parallel to the mounting level. A sheet metal frame 23 lies opposite the narrow side faces of the cartridge 4 projecting from the wall 7, forming the end of the thermal insulation on the system side 22, which also forms an insulating mass 26 which is located between the wall 20 and a cover 25.

The hollow chamber between the wall 7 of the cartridge 4 and the central area 3 is likewise filled with an insulating mass 18. The insulating masses 18, 26 can be made from mineral wool.

In the area of the wall 7, the thermal insulation on the bursting disc side 4 has fastening elements, in particular in the form of locking nuts 8. The exterior thread of mounting screws 17 with which a cover 12 formed of a metal sheet, for example an aluminium sheet, can be attached to the thermal insulation 4, in particular the cartridge can be screwed into the interior thread of the nuts 8.

The cover has an edge section 19 which can stretch over a gap or a niche 16 which extends between the narrow side of the bursting disc thermal insulation 4 and the system thermal insulation 22. This niche, the width of which is generally determined by the width of the flange area 2, is required in order to allows for subsequent replacement of a bursting disc 1. The bottom of the niche 16 or the gap between the thermal insulation 4, 22 is formed by the flange area 2.

The niche 16 is closed by the edge area of the cover 12, wherein a collar 14 stretching across the entire edge of the cover 12 lies over a bar 24 with which the sheet metal frame 23 of the cover 25 overtops the thermal insulation on the system side. The central area 13 of the cover 12 is used for attachment to the bursting disc 1.

Figure 2:
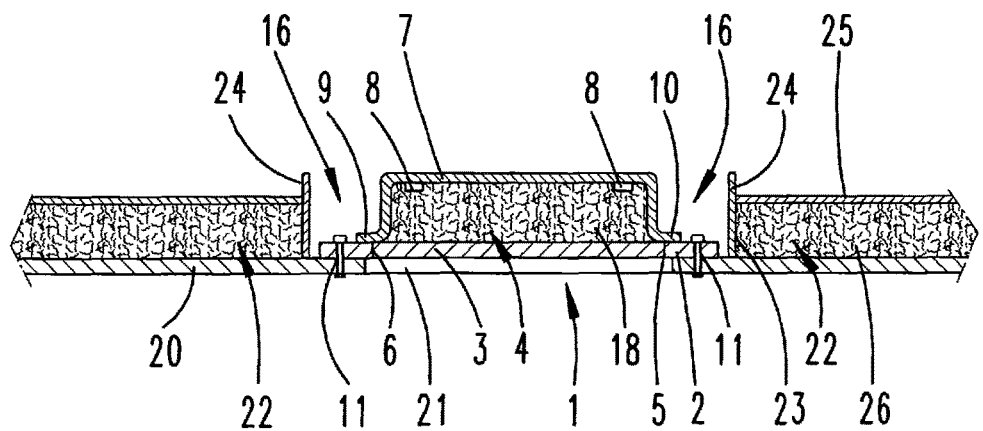
FIG. 2 is the section according to the line II-II in FIG. 1.

The installation of the bursting disc 1 according to the invention is done in three steps:

In a first step, the flange area 2 of the bursting disc 1 is attached to the edge of the opening 21 so that the bursting disc 1 fully closes the opening 21. The status shown in FIGS. 1 and 2 is then achieved, in which the thermal insulation on the bursting disc side 4 is surrounded by a circumferential gap-like niche 16 which is bordered on one side by the narrow edge of the thermal insulation on the bursting disc side 4 and on the other side by the narrow edge of the thermal insulation on the system side 22 and which has a bottom which is formed by the flange area 2 and which is open at the top.

In a second installation step, a loose insulation wool is inserted into this niche 16 which is open at the top so that thermal insulation on the flange side 15 is formed.

In a subsequent third installation step, the gap 16 is closed. To this end, the cover 12 is connected to the bursting disc 1. This is done using mounting screws 17 which are screwed into the nuts 8. As a result, the bar on the system side 24 which is formed by an overhang of the sheet metal frame 23 is overlapped by a collar 14 formed by a fold so that protection against rain is ensured.

The functioning of the bursting disc in the event of an explosion is as follows:

Excess pressure which occurs inside a hollow chamber on the systems side, which is surrounded by the wall 20, in the event of an explosion leads to the detachment of the central area 3 in the predetermined breaking line area 5 from the flange area 2. A hinge area 6 can be designed so that the detached Central area 3 can swing open. As a result, the thermal insulation there on the flange side 15 is compressed. The cover 12 formed by a cover sheet deforms there.

The design set out above is used to explain invention recorded by the application as a whole, which also independently builds on the state of the art at least through the following combinations of features, namely:

A bursting disc which is characterised by thermal insulation on the flange side 15 which is applied after attachment of the flange area 2 to the edge of the opening 21 in such a manner as to fill the niche 16 on the flange area 2, and a cover 12 which can be attached to the bursting disc 1 which protrudes over the flange area 2 in its attached state such that the thermal insulation in the niche 16 is covered in a direction determined by the flange area 2.

A bursting disc which is characterised in that the thermal insulation on the bursting disc side 4 is formed of a cartridge which is formed by a metallic wall 7 which is firmly attached to the flange area 2 by the central area 3 or in the area of a hinge 6.

A bursting disc which is characterised in that the cover 12 is attached to the thermal insulation on the bursting disc side 4 by means of fastening elements.

A bursting disc which is characterised in that the fastening element has locking nuts 8 which are assigned to the metallic wall 7 of the cartridge.

A bursting disc which is characterised in that the edge of the cover 12 forms a circumferential collar 14 pointing in the direction of the flange area 2 in order to overhang a bar 24 of a sheet metal frame 23 on the system side.

A bursting disc which is characterised in that the cover 12 is formed of a sheet which stretches across the entire plan surface of the bursting disc 1.

A bursting disc which is characterised in that the thermal insulation on the flange side 15 is formed of loose insulation wool inserted into the niche 16.

A bursting disc arrangement which is characterised in that the bursting disc 1 is part of a wall of a ventilation system and is connected to the edge of the opening 21 in the wall 20 of the ventilation system with fastening elements, in particular with mounting screws which reach through the mounting openings 11, which wall 20 is provided with thermal insulation on the system side 22 which extends to bordering the flange area 2.

A bursting disc arrangement which is characterised in that the thermal insulation on the system side 22 reaches to a sheet metal frame 23 which surrounds the flange area 2, the overhang 24 of which is overlapped by the collar 14 of the cover 12.

All features disclosed are essential to the invention (on their own as well as in combination with one another). The disclosure content of the associated/attached priority documents (copy of the earlier application) is included in full in the application disclosure, also for the purposes of including the features from these documents in the claims for this application. The subclaims, with their features, characterise independent further inventive developments on the state of the art, in particular making divisional applications on the basis of these claims.

What is claimed is:

1. A bursting disc with a flange area for attachment to an edge of an opening in a wall of a ventilation system, the central area of which, bordered on the flange area by a predetermined breaking line, is equipped with thermal insulation on the bursting disc side which stretches at least not over fastening elements of the flange area so that a niche is formed bordered by the flange area and the thermal insulation on the bursting disc side,
   characterised by thermal insulation on a flange side which is applied to the flange area after attachment of the flange area to the edge of the opening in such a manner as to fill the niche, and
   a cover which is attached to the bursting disc which, in its attached state, protrudes over the flange area such that the thermal insulation located in the niche is covered in a direction determined by the flange area.

2. The bursting disc according to claim 1, characterised in that the thermal insulation on the bursting disc side is formed of a cartridge which is formed by a metallic wall which is firmly attached to the flange area by the central area or in the area of a hinge.

3. The bursting disc according to claim 2, characterised in that the cover is attached to the thermal insulation on the bursting disc side by means of second fastening elements.

4. The bursting disc according to claim 3, characterised in that the second fastening elements have locking nuts which are assigned to the metallic wall of the cartridge.

5. The bursting disc according to claim 1, characterised in that an edge of the cover forms a circumferential collar pointing in the direction of the flange area which overlaps a bar of a sheet metal frame on the system side.

6. The bursting disc according to claim 1, characterised in that the cover is formed of a sheet which extends over the entire plan surface of the bursting disc.

7. The bursting disc according to claim 1, characterised in that the thermal insulation on the flange side is formed of loose insulation wool inserted into the niche.

8. A bursting disc arrangement with the bursting disc according to claim 1, characterised in that the bursting disc is part of the wall of the ventilation system and is connected to the edge of the opening in the wall of the ventilation system using fastening elements, in particular using mounting screws which reach through mounting openings, which wall is equipped with thermal insulation on the system side which extends to bordering on the flange area.

9. The bursting disc arrangement according to claim 8, characterised in that the thermal insulation on the system side reaches to a sheet metal frame which surrounds the flange area, the overhang of which is overlapped by a circumferential collar of the cover.

* * * * *